United States Patent [19]

Itani et al.

[11] Patent Number: 4,614,898

[45] Date of Patent: Sep. 30, 1986

[54] ELECTRONIC BALLAST WITH LOW FREQUENCY AC TO AC CONVERTER

[75] Inventors: Abdallah M. Itani, Ballston Spa; Victor D. Roberts, Burnt Hills, both of N.Y.

[73] Assignee: General Electric Company, Schenectady, N.Y.

[21] Appl. No.: 748,077

[22] Filed: Jun. 24, 1985

[51] Int. Cl.[4] .............................................. H05B 37/02
[52] U.S. Cl. ................................. 315/224; 315/171; 315/176; 315/226; 315/DIG. 7
[58] Field of Search ................. 315/DIG. 7, 224, 226, 315/171, 174–176

[56] References Cited

U.S. PATENT DOCUMENTS

| | | | |
|---|---|---|---|
| 3,896,336 | 7/1975 | Schreiner et al. | 315/226 |
| 4,170,747 | 10/1979 | Holmes | 315/DIG. 7 |
| 4,350,930 | 9/1982 | Peil et al. | 315/49 |
| 4,484,107 | 11/1984 | Kaneda et al. | 315/176 |
| 4,567,404 | 1/1986 | Flugan | 315/DIG. 7 |

OTHER PUBLICATIONS

U.S. patent application Ser. No. 562,919, to Flugan, filed Dec. 19, 1983.

*Primary Examiner*—Harold Dixon
*Attorney, Agent, or Firm*—Mark L. Mollon; James C. Davis, Jr.; Marvin Snyder

[57] ABSTRACT

A gas discharge lamp is started with a high frequency AC signal from an oscillator and then operates on a low frequency AC signal provided by an AC to AC converter synchronously with the AC supply line. The low voltage switching devices of the converter are protected from the high voltages of the high frequency oscillator by locking the converter in a single phase during starting.

11 Claims, 5 Drawing Figures

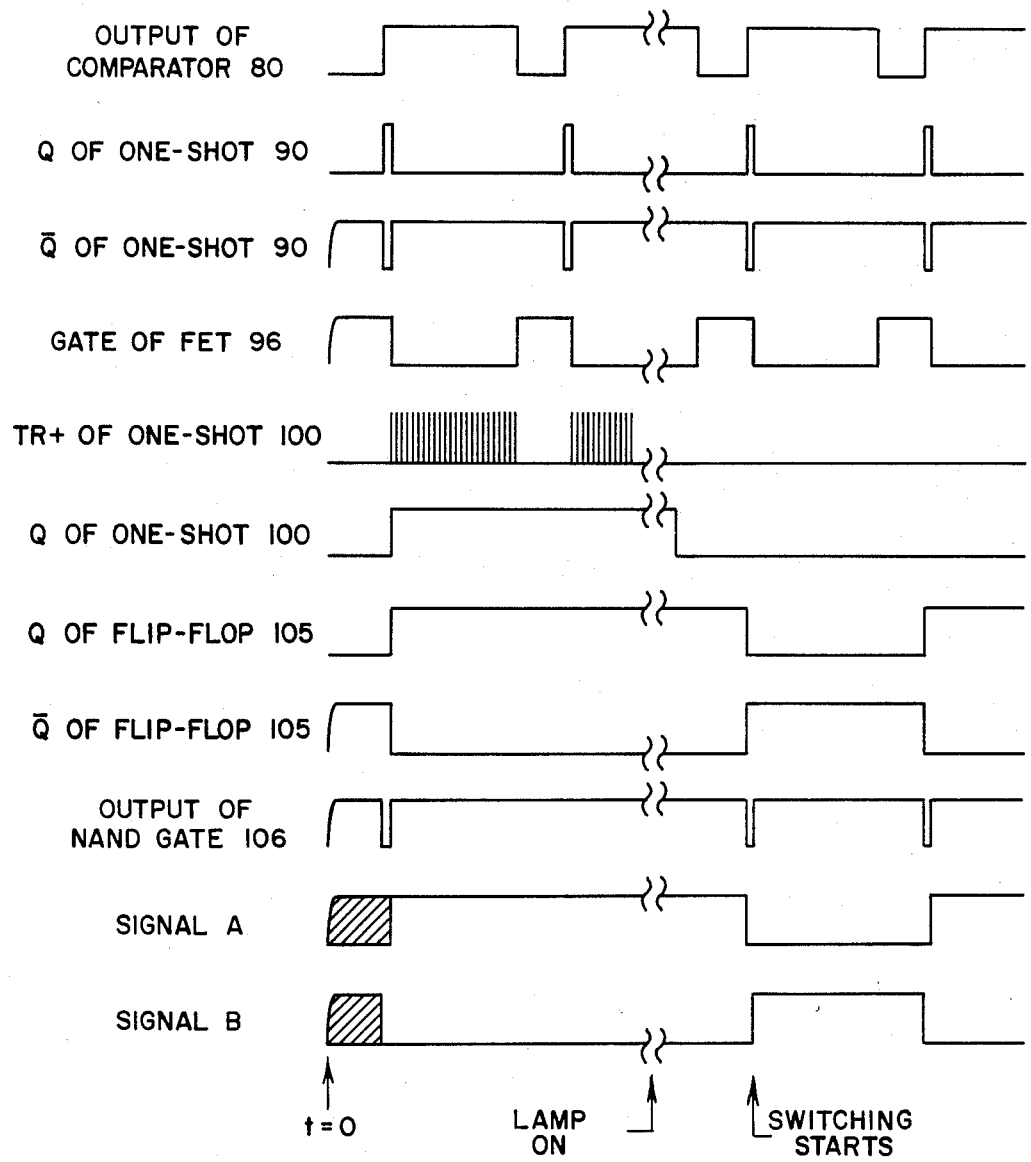

ELECTRONIC BALLAST WITH LOW FREQUENCY AC TO AC CONVERTER

BACKGROUND OF THE INVENTION

The present invention relates in general to an electronic circuit for operating arc discharge lamps, and more specifically to providing high frequency energy for starting an arc in a lamp and providing low frequency energy for running a lamp once an arc has been established.

Gas discharge lamps can be operated on either alternating current (AC) or direct current (DC). DC operation is often desirable because of the low cost of DC ballasts and because of the reduced amount of electromagnetic interference (EMI) associated with DC operation. However, some lamps, e.g. fluorescent lamps and high pressure metal halide lamps, exhibit undesirable characteristics when operated on DC. In these lamps, DC operation causes the active gas to be transported to the cathode region by the process of cataphoresis. This process causes decreased light output in fluorescent lamps and color shifts in high pressure metal halide lamps which use multiple active gases.

Cataphoresis has been avoided in DC operated high pressure metal halide lamps by positioning the lamp vertically with the lamp cathode on the top. However, any movement from this orientation changes the color of the light produced considerably.

Accordingly, it is desirable to use AC power to operate those lamps which would be subject to cataphoresis when operated on DC power. One well known technique for providing AC lamp power utilizes an AC to AC converter for periodically reversing the polarity of the lamp voltage. In lamp ballasts employing this technique, the lamp is operated at a high frequency, e.g. a frequency higher than the 60 hertz line frequency, in order to reduce the size of inductive and capacitive ballasting elements. High frequency operation also permits the use of resonant circuits for providing the high voltage levels needed to initially start the arc discharge.

Gas discharge lamps have also been operated directly from the AC power line. In these instances, it is also known to employ high frequency voltages for starting an arc and for helping to re-establish an arc in each new half-cycle in case the re-ignition voltage exceeds the available line voltage.

The lamp operating circuits using fast switching transitions are subject to undesirable amounts of EMI. As described in U.S. patent application Ser. No. 748,076, filed 6-24-85, of common assignment and filed concurrently herewith, a gas discharge lamp may be operated by an AC to AC converter synchronously with the AC power line for minimizing EMI conduction to the AC power line.

In an AC to AC converter for operating a discharge lamp, such as is shown in application Ser. No. 748,076, filed 6-24-85, it is desirable to use a bridge configuration of semiconductor switches in the converter which have as low a voltage rating as possible in order to reduce circuit costs. The maximum DC voltage supplied to the converter bridge from the rectifier connected to a utility's AC power line is approximately 180 volts. This voltage is typically sufficient to maintain the arc discharge once the lamp is in a normal running condition. However, voltages in excess of 1000 volts may be required to start the lamp.

Accordingly, it is a principal object of the present invention to provide a circuit for starting and operating gas discharge lamps in any orientation without the occurrence of cataphoresis.

It is a further object of the invention to start a gas discharge lamp with a high frequency AC signal and to operate the lamp with a low frequency AC signal under normal conditions.

It is another object of the invention to apply high breakdown and glow-to-arc transition voltages across a lamp connected to an AC to AC converter without the high voltages appearing across the semiconductor bridge switches.

It is yet another object of the invention to provide a lamp operating circuit whose functions coincide with the requirements of the lamp as it shifts between operating modes.

It is another object of the invention to provide a lamp operating circuit which results in very little conducted EMI on the power supply lines.

SUMMARY OF THE INVENTION

These and other objects are achieved by a method for starting and operating a gas discharge lamp which is connected to a full-bridge converter. The method comprises the steps of (1) locking the converter into a single phase so that one converter output is held substantially at the voltage of one of the converter inputs and the other converter output is held substantially at the voltage of the other converter input, (2) coupling a high frequency signal to the lamp at a converter output until an arc is established and becomes stabilized in the lamp, and (3) thereafter switching the converter at a low frequency, whereby the lamp runs in a normal condition.

The invention also provides a circuit for operating a gas discharge lamp from a low frequency AC supply. A diode rectifier is adapted to receive a low frequency AC voltage and provides a DC voltage. A full-bridge converter is connected to receive the DC voltage and is adapted to be coupled at its output to a gas discharge lamp. A high frequency oscillator is coupled to the converter output and is adapted to be coupled in series with the lamp. A current sensor is connected to the converter for measuring the current in the lamp. A control means is connected to the converter, the oscillator and the current sensor for holding the converter in a single phase when current in the lamp is below a predetermined magnitude so that high frequency oscillations from the oscillator may be applied to the lamp when the diodes in the diode rectifier are nonconductive, or off, and until a first predetermined time after an arc has been established in the lamp. The control means switches the phases of the converter at the low frequency and inhibits the oscillator when current in the lamp is not below the predetermined magnitude for a second predetermined time.

BRIEF DESCRIPTION OF THE DRAWINGS

The novel features of the invention are set forth with particularity in the appended claims. The invention itself, however, as to organization and method of operation, together with further objects and advantages thereof, may best be understood by reference to the following description taken in conjunction with the accompanying drawings in which:

FIG. 5 is a timing diagram illustrating the method of operation of the invention.

DETAILED DESCRIPTION OF THE INVENTION

Figure 1:
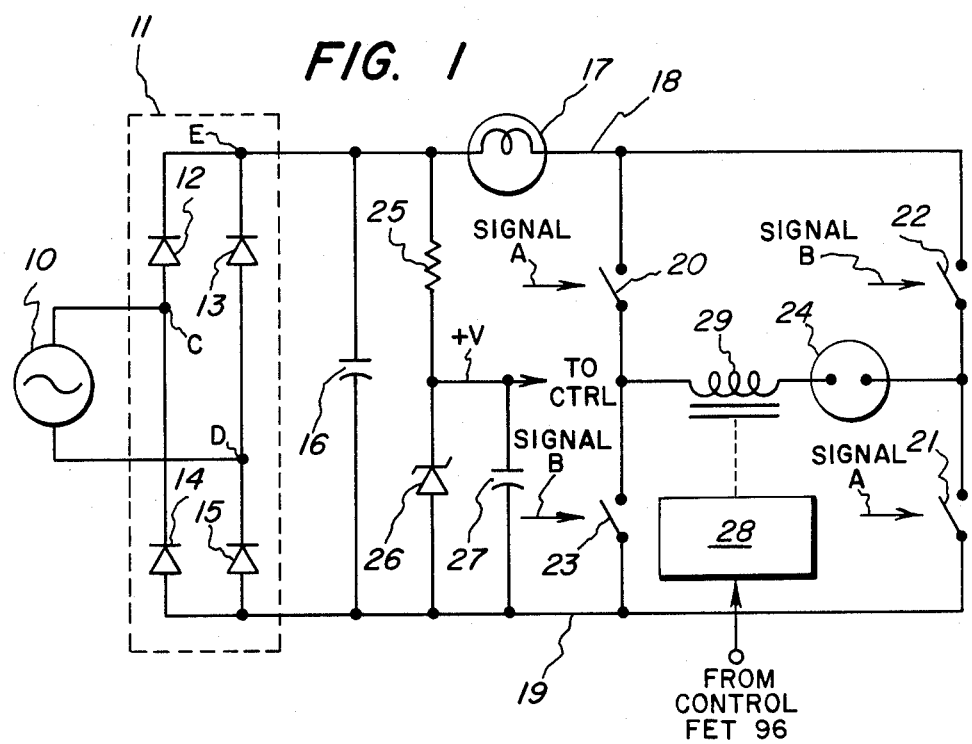
FIG. 1 is a schematic diagram of the circuit of the present invention.

The lighting system of the invention in which relatively low voltage lamp operating power is applied to a polarity reversing switch while a high voltage, high frequency starting voltage is applied directly to the lamp at the output of the converter bridge, is shown in FIG. 1. An AC source 10 is connected to an AC to AC converter including a full-wave rectifier 11 comprising diodes 12–15. A DC power supply comprising rectifier 11 and a filter capacitor 16, supplies power to an incandescent filament 17, to a polarity reversing bridge (shown as a full-bridge DC to AC converter comprising switches 20–23), to a starting oscillator 28 and to the control circuitry (shown in FIG. 4).

Filament 17 provides resistive ballasting and in FIG. 1 is shown connected in series with the polarity reversing converter bridge comprising switches 20–23. The inputs to the DC to AC converter are taken from a positive DC rail 18 and a negative DC rail 19. An arc lamp 24 is coupled to the outputs of the converter. Thus, a voltage of one polarity may be applied to lamp 24 by closing switches 20 and 21 while switches 22 and 23 are open (referred to as one phase of the bridge). The polarity of the lamp voltage can be reversed (to the opposite phase) by opening switches 20 and 21 and closing switches 22 and 23. A control signal A is provided to switches 20 and 21 and a control signal B is provided to switches 22 and 23 for controlling the switches as desired. Circuitry for deriving control signals A and B will be described below with reference to FIG. 4. A resistor 25 and a zener diode 26 are connected in series across capacitor 15. A capacitor 27 is connected across zener diode 26. Thus, a DC voltage +V is provided across capacitor 27 for supplying a voltage level appropriate for operating the control circuitry.

FIG. 1 also shows a high frequency, high voltage oscillator 28 with direct or indirect couplings (not shown) to rails 18 and 19. The output of oscillator 28 is coupled to an inductor 29 which is connected in series with lamp 24. Oscillator 28 receives a signal from the control circuitry whereby the operation of oscillator 28 may be controlled. When starting arc lamp 24, oscillator 28 may be required to supply voltages greater than 1000 volts in the initial breakdown mode of the lamp, although some lamps require as little as 600 volts. Up to 300 volts at a frequency of about 20,000 hertz may be required when lamp 24 transitions to the glow mode.

Switches 20–23 are preferably low voltage semiconductor devices such as bipolar transistors, metal-oxide-silicon field-effect transistors (MOSFETs) or insulated gate transistors (IGTs), having a voltage rating of about 200 volts. In order to avoid burn-out of switches 20–23 by the high voltage output signal of oscillator 28, the DC to AC converter is locked in one of its phases so that one output of the DC to AC converter bridge is held substantially at the voltage of positive rail 18 while the other output of the converter bridge is held substantially at the voltage of negative rail 19. A high frequency signal from oscillator 28 may then be supplied to lamp 24 to cause breakdown, to start an arc and to stabilize the arc (stabilization typically takes 50 milliseconds or longer depending on the specific lamp used). If both switches on one side of the converter bridge were allowed to be off while oscillator 28 were operating, high voltage would be present at the junction of these two switches and would burn them out. The particular phase into which switches 20–23 are locked may depend on the orientation of lamp 24 if lamp 24 has a preferred cathode for starting. Once the arc has stabilized, the DC to AC converter is switched at a low frequency in order to run lamp 24 in its normal condition without cataphoresis.

Propagation of EMI to the supply lines from AC source 10 is greatly reduced in the present invention. Thus, as taught in the above-mentioned application Ser. No. 748,076, filed 6-24-85, the phase of the converter bridge is reversed each time that the diodes in rectifier 11 are off. This prevents EMI generated during switching from being conducted to the power lines. In addition, the present invention inhibits the operation of oscillator 28 when diodes 12–15 of rectifier 11 are conducting, i.e. oscillator 28 is allowed to operate only when the diodes are off.

Figure 2:
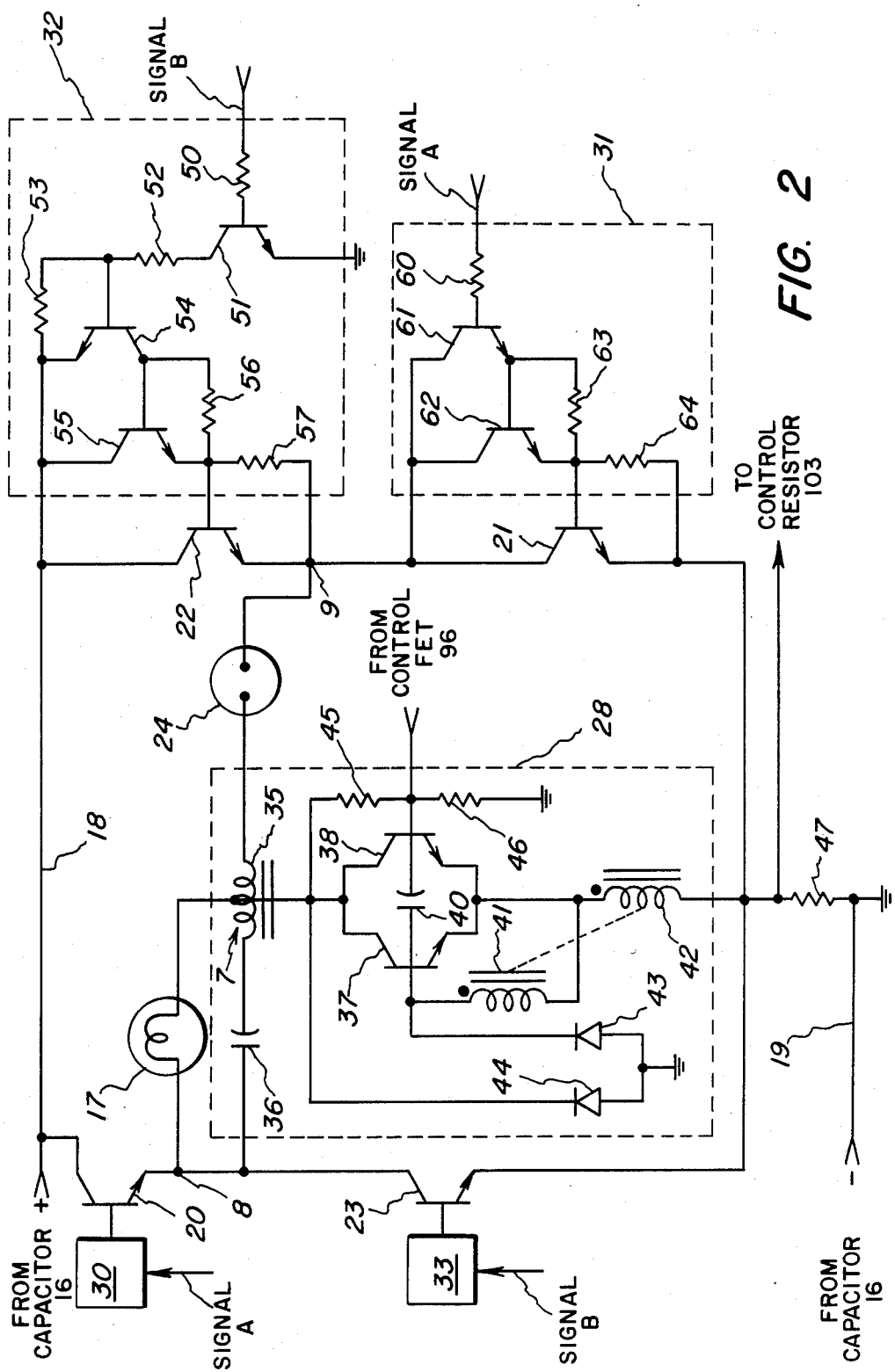
FIG. 2 is a schematic diagram of another embodiment of the circuit of the present invention showing the oscillator and the driver circuits in greater detail.

FIG. 2 illustrates an embodiment of the invention wherein oscillator 28 is nearly identical to an oscillator in a lamp operating circuit shown in U.S. Pat. No. 4,350,930, issued to Peil et al. and assigned to the assignee of the present invention. As shown in FIG. 2, oscillator 28 includes an autotransformer 35 by means of which it is coupled to lamp 24 and wherein filament 17 is connected inside (i.e. to one output terminal 8) of the converter bridge for coupling oscillator 28 to a DC voltage. Switches 20–23 are shown as bipolar transistors, each having its base electrode connected to a respective driver circuit 30–33. Driver circuits 32 and 31 are shown in detail and are identical to driver circuits 30 and 33, respectively. Each driver circuit 31 and 32 is a conventional darlington circuit. In driver circuit 32, control signal B is coupled to the base of a level shifting transistor 51 through a resistor 50. The collector of transistor 51 is coupled to the base of a pnp transistor 54 through a resistor 52. The emitter of pnp transistor 54 is connected to the collector of a transistor 55 and is coupled to the base of transistor 54 through a resistor 53. The collector of pnp transistor 54 is connected to the base of transistor 55 and is coupled to the emitter of transistor 55 through a resistor 56. A resistor 57 couples the gate of switch 22 to the emitter of switch 22. The collector of transistor 55 is connected to the collector of switch 22.

In driver circuit 31, control signal A is coupled to the base of a transistor 61 through a resistor 60. The collector of transistor 61 is connected to the collector of a transistor 62 and the collector of switch 21. The emitter of transistor 61 is connected to the base of transistor 62 and is coupled to the emitter of transistor 62 through a resistor 63. The emitter of transistor 62 is connected to the base of switch 21 and is coupled to the emitter of switch 21 through a resistor 64. The darlington driver circuits are employed to reduce the drive current which must be supplied by the control circuitry. Driver circuits 30–33 operate in a manner well known in the art.

Figure 4:
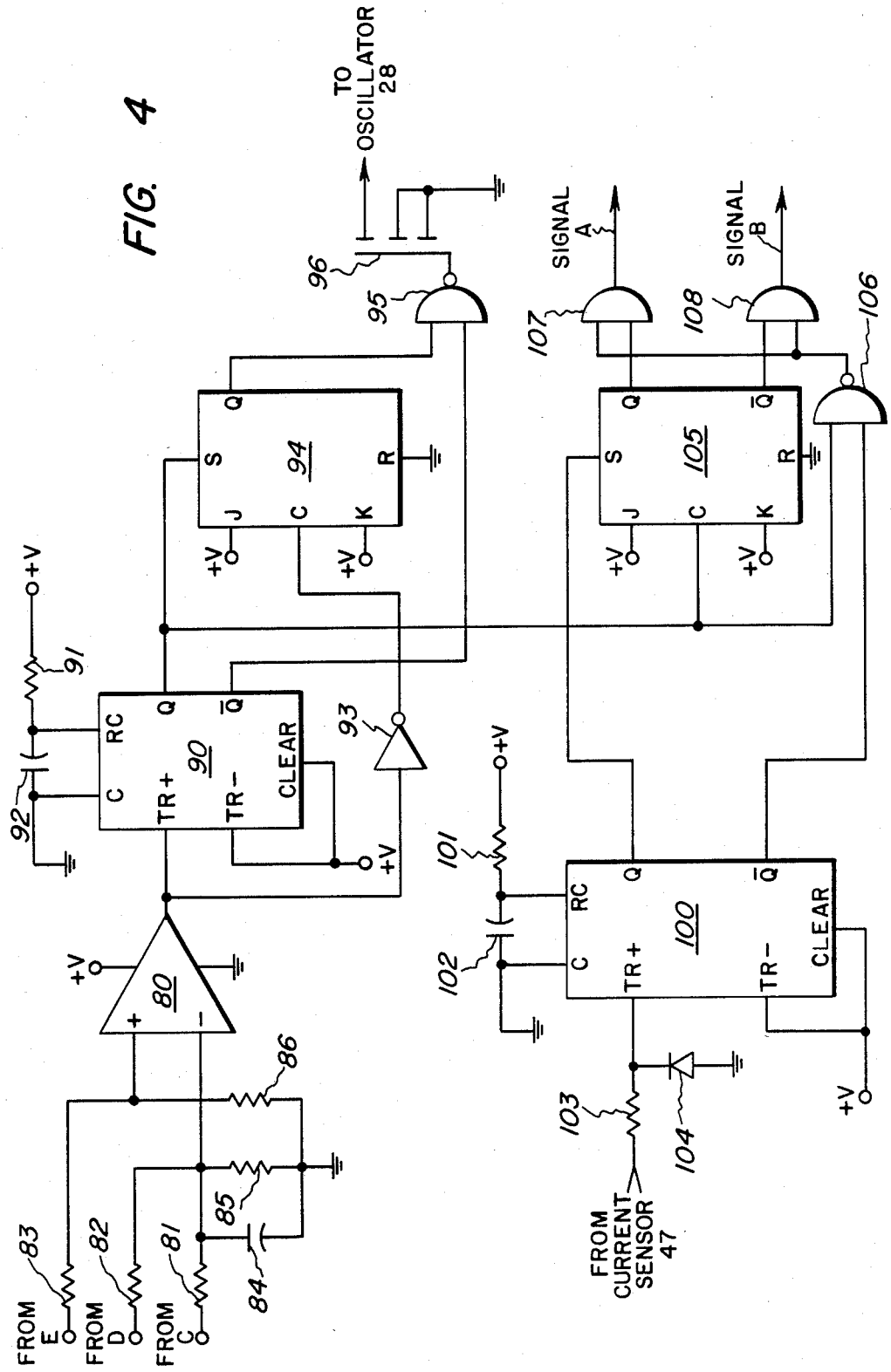
FIG. 4 is a block diagram of the control circuit of the invention.

FIG. 2 shows the series connection of filament 17, a portion of the secondary winding of an autotransformer 35 (on one side of its tap) and arc lamp 24 between the output terminals 8 and 9 of the DC to AC converter bridge. Oscillator 28 includes a capacitor 36 and the primary winding 7 of autotransformer 35 connected in series across filament 17. A voltage divider comprising resistors 45 and 46 is connected between the tap of autotransformer 35 and ground. The junction of resistors 45 and 46 is connected to the base of a transistor 38 and is connected to the drain of an FET 96 in the control circuit (FIG. 4). The collector and emitter of transistor 38 are connected to the collector and emitter, respectively, of a transistor 37. The base of transistor 38 is coupled to the base of transistor 37 through a capacitor 40. The junction of the collectors of transistors 37 and 38 is connected to the tap of autotransformer 35 and to the cathode of a diode 44. The anode of diode 44 is connected to ground and to the anode of a diode 43. The cathode of diode 43 is connected to the base of transistor 37.

A small transformer includes a secondary winding 41 of approximately two turns which is connected between the base and the emitter of transistor 37 with the dotted terminal of winding 41 connected to the base of transistor 37. A primary winding 42 of the small transformer has its dotted terminal connected to the junction of the emitters of transistors 37 and 38 and its other terminal connected to the junction of the emitters of switches 21 and 23. The latter junction is coupled to ground through a current sensing resistor 47 and is connected to a resistor 103 in the control circuit (shown in FIG. 4).

Disregarding the effect of the connection of oscillator 28 to FET 96 of the control circuit (shown in FIG. 4), oscillator 28 operates to supply a high voltage, high frequency signal to lamp 24 whenever the current in lamp 24 is below a predetermined value. Current in lamp 24 is measured by sensing the return current to capacitor 16 by means of a resistor 47 having a resistance on the order of a few ohms. Transistor 38 is a triggering switch for oscillator 28 and controls transistor 27 which is a triggered monostable switch. Due to the connection of the emitter of transistor 38 to resistor 47 through primary winding 42, and the base of transistor 38 to the voltage divider comprised of resistors 45 and 46, the triggering switch will turn on when the voltage across resistor 46 is greater than the voltage across resistor 47 (which is proportional to lamp current) plus the turn on voltage $V_{BE}$ of transistor 38. Thus, oscillator 28 automatically turns on whenever lamp current is below a value determined by the resistance value of resistors 45, 46 and 47. Furthermore, oscillator 28 may be inhibited from operating at any time by grounding the junction of resistors 45 and 46 to turn off transistor 38. This will be accomplished by the control circuit using FET 96 (FIG. 4) to couple the base of transistor 38 to ground first, during the dwell time between alternate phases so that these zero crossings of lamp current are not mistaken for a starting condition, and second, when diodes 12-15 in rectifier 11 (FIG. 1) are conducting so that EMI is not conducted to the power line from oscillator 28.

Oscillator 28 produces high voltage, high frequency signals as a result of high frequency switching of triggered monostable transistor 37 which produces ringing between capacitor 36 and autotransformer 35 and, thereby, an alternating current component in the primary 7 of autotransformer 35. A stepped up alternating current component is produced across autotransformer 35 and applied to lamp 24. A pulsating current is also produced in filament 17. Oscillator 28 is designed to operate at a frequency of 20,000 hertz or higher.

More particularly, AC current flow in the primary 7 of autotransformer 35 takes place in the following manner. Capacitor 40 is initially charged to the voltage across resistor 46. When transistor 38 turns on because of a low value of lamp current, it supplies current to primary winding 42 which in turn supplies base current to transistor 37 through secondary winding 41. As current in primary winding 42 increases, regenerative feedback through the small transformer results in even more current flowing through transistor 37. The current flowing in transistors 37 and 38 is supplied through capacitor 36 and the primary winding 7 of autotransformer 35, thus producing a voltage across the secondary of autotransformer 35.

When both transistors 37 and 38 are conducting, capacitor 40 discharges. As capacitor 40 discharges, the forward bias is removed from transistor 37 and it turns off. Due to the action of autotransformer 35, capacitor 40 obtains a reverse charge as transistor 37 turns off. This reverse charge is limited by diode 43, but is large enough to temporarily turn off transistor 38. At this point, the current path through capacitor 36, primary winding 7 of autotransformer 35 and transistor 37 is blocked. Therefore, a resonant current will flow through capacitor 36, primary winding 7 of autotransformer 35 and filament 17, thus producing a reversed voltage across the secondary of autotransformer 35. Once capacitor 40 is recharged by the voltage divider including resistors 45 and 46, transistors 38 and 37 will again conduct. The high voltage, high frequency output of oscillator 28 will continue to be coupled to lamp 24 until an arc is established in lamp 24 or until oscillator 28 is inhibited as will be described below with reference to FIG. 4.

Figure 3:
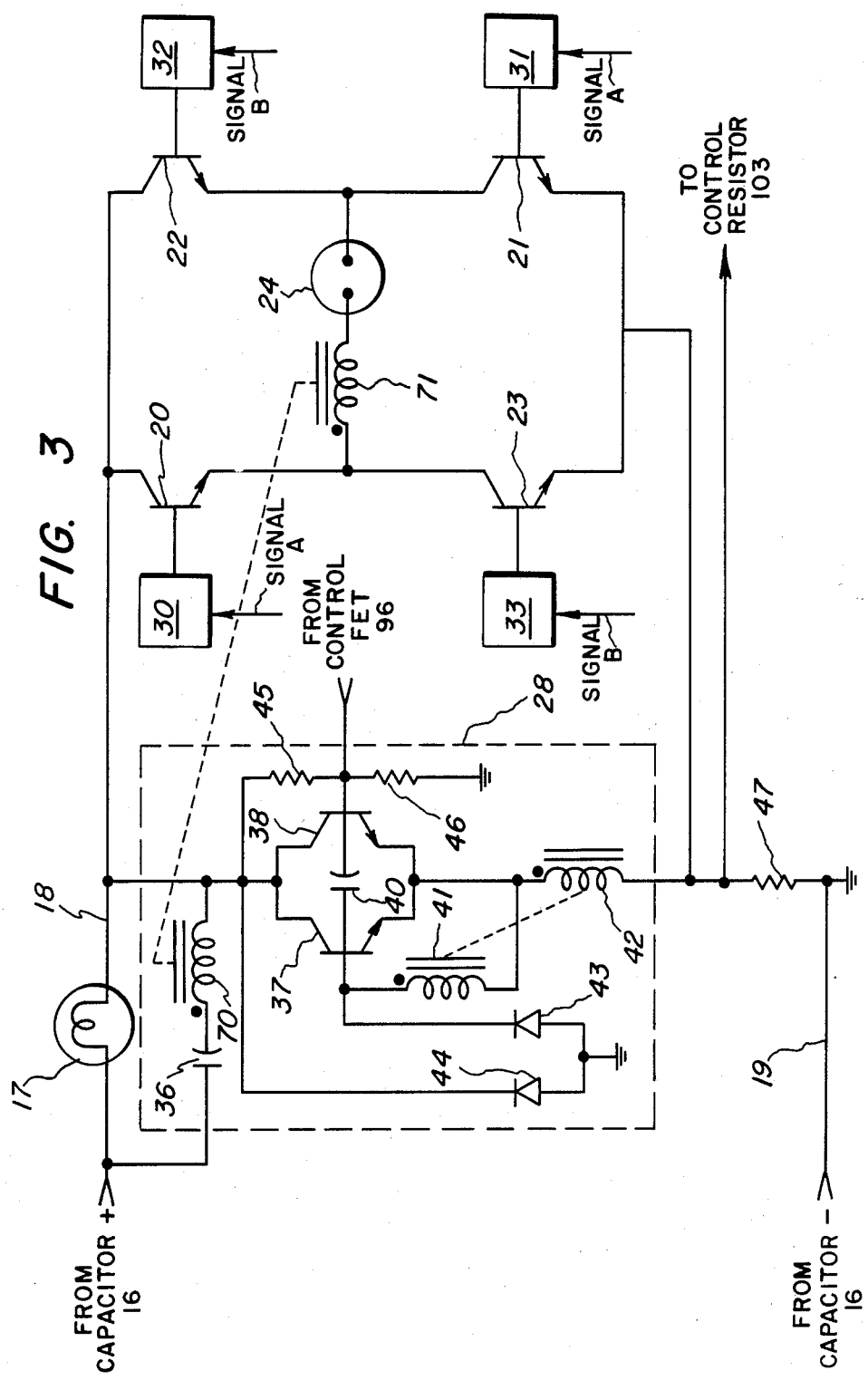
FIG. 3 is a schematic diagram of still another embodiment of the invention.

In FIG. 3, an embodiment is shown wherein filament 17 is connected in DC rail 18 and a transformer with a primary winding 70 and a secondary winding 71 is used to couple the output of oscillator 28 to lamp 24. The operation of oscillator 28 in this embodiment is substantially identical to its operation in the embodiments described above. Furthermore, in this embodiment the high voltage, high frequency signals from oscillator 28 are coupled directly to lamp 24 by means of secondary winding 71 so as not to appear across switches 20-23.

Referring now to FIG. 4, the control circuit of the present invention will be described. The control circuit has four inputs (excluding a DC supply voltage +V) and three outputs. Three of the inputs are used to sense the conductive state of diodes 12-15 in rectifier 11 while the fourth input is used to determine whether oscillator 28 is operating. Two of the outputs are control signals A and B for switching the phase of the converter bridge while the third output is used to inhibit oscillator 28 at the times described above.

One side of resistors 81, 82 and 83 is connected to points C, D and E, respectively, of FIG. 1. The other side of resistor 83 is connected to the noninverting input of a comparator 80 and to a resistor 86. The other side of resistors 81 and 82 are both connected to one side of a capacitor 84, one side of a resistor 85 and the inverting input of comparator 80. The other side of capacitor 84 and resistors 85 and 86 are connected to ground.

The output of comparator 80 is connected to the positive edge trigger input TR+ of a one-shot multivibrator 90. The negative trigger input TR− and clear input of one-shot 90 are connected to +V. The C input of one-shot 90 is connected to ground and to a capacitor 92. The RC input of one-shot 90 is connected to the junction of capacitor 92 and a resistor 91. The other end of resistor 91 is connected to +V. The Q output of one-shot 90 is connected to the set input S of a JK flip-flop 94, to the clock input C of a JK flip-flop 105 and to one input of a two-input NAND gate 106. The $\overline{Q}$ output of one-shot 90 is connected to one input of a two-input NAND gate 95.

The output of comparator 80 is also coupled through an inverter 93 to the clock input C of flip-flop 94. The J input and K inputs of flip-flop 94 are connected to +V while the reset input R is grounded. The output Q of flip-flop 94 is connected to the other input of NAND gate 95. The output of NAND gate 95 is connected to the gate of FET 96. The source of FET 96 is grounded while the drain of FET 96 is connected to the junction of resistors 45 and 46 of FIGS. 2 and 3.

The fourth input to the control circuit from current sensing resistor 47 of FIGS. 2 and 3 is coupled through of a resistor 103 to the cathode of a diode 104 and to the positive trigger TR+ of a retriggerable one-shot multivibrator 100. The anode of diode 104 is connected to ground. The negative trigger TR− and the clear input of one-shot 100 are connected to +V. The C input of one-shot 100 is connected to ground and to a capacitor 102. The RC input of one-shot 100 is connected to the junction of capacitor 102 and a resistor 101. The other end of resistor 101 is connected to +V. The Q output of one-shot 100 is connected to the set input S of JK flip-flop 105. The $\overline{Q}$ output of one-shot 100 is connected to the other input of NAND gate 106.

The J and K inputs of flip-flops 105 are connected to +V. The Q output of flip-flop 105 is connected to one input of a two-input AND gate 107 and the $\overline{Q}$ output is connected to one input of a two-input AND gate 108. The output of NAND gate 106 is connected to the other inputs of AND gates 107 and 108. The outputs of AND gates 107 and 108 provide control signals A and B and are connected to driver circuits 30-33.

Comparator 80 may comprise, for example, an integrated circuit CA3130 and flip-flops 94 and 105 may comprise an integrated circuit CD4027, both available from RCA. One-shot multivibrators 90 and 100 may comprise an integrated circuit MC14528 available from Motorola.

Comparator 80 senses when diodes 12-15 are nonconducting and provides a high output signal at those times. A transition to a high signal output of comparator 80 triggers one-shot 90 which produces a short output pulse. The length of this pulse is determined by the values of resistors 91 and capacitor 92 in accordance with the switching times of switches 20-23, e.g. on the order of about 25 microseconds. The pulse length corresponds to a dwell time during which all of switches 20-23, as shown in FIG. 2, are made nonconducting to prevent direct connections between positive rail 18 and negative rail 19 through switches on the same side of the converter bridge.

The output pulse from the Q output of one-shot 90 sets flip-flop 94. After the pulse from one-shot 90 has ended, the Q output of flip-flop 94 remains high until the output of comparator 80 goes low, making inverters 93 and the C input of flip-flop 94 go high.

A high output signal from NAND gate 95 inhibits oscillator 28 (FIG. 1) by turning on FET 96. The output signal of NAND gate 95 is high when either of its input signals is low. The $\overline{Q}$ output signal of one-shot 90 is low during the dwell time and the Q output signal of flip-flop 94 is low when diodes 12-15 are conducting. Thus, oscillator 28 is inhibited during both of these conditions. Inverter 93 and flip-flop 94 are employed to provide an input signal to NAND gate 95, rather than connecting the output of comparator 80 directly to NAND gate 95, in order to compensate for the propagation delay of one-shot 90.

The remainder of the control circuit of FIG. 4 provides the desired control of switches 20-23 (FIG. 2). When lamp 24 is being powered by oscillator 28, as shown in FIG. 2, high frequency voltage signals are developed across current sensing resistor 47. The rising edge of these signals trigger one-shot 100 (FIG. 4) so that its Q output goes high and its $\overline{Q}$ output goes low. Resistor 101 and capacitor 102 set the time constant of one-shot 100 preferably to about 50 milliseconds. Since one-shot 100 is retriggerable, each input signal restarts the timing period. Thus, one-shot 100 remains set (Q is high) until 50 milliseconds after lamp 24 has started (i.e. an arc is established) and oscillator 28 has turned off. The 50 millisecond time period is chosen to be longer than both the cycle time of oscillator 28 and the dwell time imposed by one-shot 90.

During the timing period of one-shot 100, the Q output of one-shot 100 sets flip-flop 105 and the $\overline{Q}$ output of one-shot 100 goes low to produce a high output signal from NAND gate 106, so that control signals A and B are held in predetermined states. Therefore, the converter bridge of FIGS. 1-3 is held in a single predetermined phase during starting and for a waiting period during which the arc in lamp 24 stabilizes.

When the timing period of one-shot 100 expires, switching of flip-flop 105, and thus the converter bridge, begins. The outputs of flip-flop 105 are toggled by each pulse from one-shot 90 indicating that diodes 12-15 (FIG. 1) have turned off. However, at the same time that flip-flop 105 is toggled, the output signal of NAND gate 106 goes low and remains low for the duration of the dwell period. By virtue of the low output signal of NAND gate 106 being fed to the inputs of AND gates 107 and 108, control signals A and B are both low during the dwell period, thus turning off all of switches 20-23. Thereafter, control signals A and B correspond to the Q and $\overline{Q}$ output signals, respectively, of flip-flop 105.

FIG. 5 is a timing diagram for the control circuit of FIG. 4. The lighting system is first energized at t=0. Control signals A and B are initially locked in a particular phase while oscillator 28 (FIG. 1) is allowed to operate during the times just after diodes 12-15 turn off and until they turn on again. 50 milliseconds after the last high frequency signal from current sensing resistor 47 (FIG. 2), the Q output of one-shot 100 (FIG. 4) goes low and the switching of control signals A and B is enabled. Control signals A and B will reverse each half-cycle of AC source 10 (FIG. 1), but both will be low during a dwell period after diodes 12-15 become nonconducting.

The foregoing has described a circuit for starting and operating a gas discharge lamp in any orientation without cataphoresis. The lamp is started with a high frequency AC signal and is operated under a normal running condition with a low frequency AC signal. The high voltage starting signals applied to the lamp do not appear across the semiconductor converter switches. The lamp operating circuit provides the correct functions for each mode of the lamp and results in very little conducted EMI appearing on the power supply lines.

While preferred embodiments of the present invention have been shown and described herein, it will be obvious that such embodiments are provided by way of example only. Numerous variations, changes and substitutions will occur to those skilled in the art without departing from the invention herein. Accordingly, it is intended that the invention be limited only by the spirits and scope of the appended claims.

What is claimed is:

1. A method for starting and operating a gas discharge lamp connected to a full-bridge DC to AC converter, said method comprising the steps of:
   (1) locking said converter into a single phase so that one output of said converter is held substantially at the voltage at one of the inputs of said converter and the other output of said converter is held substantially at the voltage at the other input of said converter;
   (2) coupling to a high frequency signal to said lamp at a converter output until an arc is established and becomes stabilized in said lamp; and
   (3) thereafter switching said converter at a low frequency, whereby said lamp runs in a normal condition.

2. The method of claim 1 wherein said converter is coupled to an AC source by a diode rectifier and further comprising the steps, conducted simultaneously with steps (1) and (2), of:
   determining when all the diodes in said diode rectifier are off; and
   inhibiting said high frequency signal when said diodes are not off.

3. A circuit for operating a gas discharge lamp from a low frequency AC supply, comprising:
   a diode rectifier adapted to receive a low frequency AC voltage for providing a DC voltage;
   a full-bridge DC to AC converter connected to receive said DC voltage and adapted to have a gas discharge lamp coupled to its outputs;
   a high frequency oscillator connected to receive said DC voltage, the output of said oscillator being coupled to said converter output and being adapted to be coupled in series with said lamp;
   a current sensor connected to said converter for measuring the current in said lamp; and
   control means coupled to said converter, said oscillator and said current sensor for holding said converter in a single phase when current in said lamp is below a predetermined magnitude so that high frequency oscillations from said oscillator may be applied to said lamp when the diodes in said diode rectifier are off and until a first predetermined time after an arc has been established in said lamp, and for switching the phases of said converter at said low frequency and inhibiting said oscillator when current in said lamp is not below said predetermined magnitude for a second predetermined time.

4. The circuit of claim 3 further comprising an incandescent filament coupling said DC voltage to said converter.

5. The circuit of claim 4 further comprising a transformer for coupling said oscillator output to said converter output.

6. The circuit of claim 3 further comprising an incandescent filament coupled to said converter and adapted to to be connected in series with said lamp.

7. The circuit of claim 6 further comprising a transformer for coupling said oscillator output to said converter output.

8. The circuit of claim 7 wherein said transformer comprises an autotransformer.

9. A lighting system comprising:
   a diode rectifier adapted to receive a low frequency AC voltage for providing a DC voltage;
   a full-bridge DC to AC converter connected to receive said DC voltage;
   a gas discharge lamp coupled to the output terminals of said converter;
   an incandescent filament coupled in series with said converter;
   a high frequency oscillator connected to receive said DC voltage and having one of its output terminals connected to one output terminal of said converter and having its other output terminal connected to said lamp;
   a current sensor connected to said converter for measuring the current in said lamp; and
   control means coupled to said converter, said oscillator and said current sensor for holding said converter in a single phase when current in said lamp is below a predetermined magnitude so that high frequency oscillations from said oscillator may be applied to said lamp when the diodes in said diode rectifier are off and until a first predetermined after an arc has been established in said lamp, and for switching the phases of said converter at said low frequency and inhibiting said oscillator when current in said lamp is not below said predetermined magnitude for a second predetermined time.

10. The lighting system of claim 9 wherein said lamp comprises a high pressure metal halide lamp.

11. The lighting source of claim 9 wherein said lamp comprises a fluorescent lamp.

* * * * *